(12) United States Patent
Shin et al.

(10) Patent No.: US 12,719,127 B2
(45) Date of Patent: Aug. 25, 2026

(54) BATTERY CASE

(71) Applicants: HYUNDAI MOTOR COMPANY, Seoul (KR); KIA CORPORATION, Seoul (KR)

(72) Inventors: Gyung Hoon Shin, Seoul (KR); Jong Gyu Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 310 days.

(21) Appl. No.: 18/417,623

(22) Filed: Jan. 19, 2024

(65) Prior Publication Data

US 2025/0062470 A1 Feb. 20, 2025

(30) Foreign Application Priority Data

Aug. 14, 2023 (KR) ........................ 10-2023-0106344

(51) Int. Cl.
*H01M 50/249* (2021.01)
*H01M 10/625* (2014.01)
*H01M 50/271* (2021.01)
*B60K 1/00* (2006.01)

(52) U.S. Cl.
CPC ....... *H01M 50/249* (2021.01); *H01M 10/625* (2015.04); *H01M 50/271* (2021.01); *B60K 2001/005* (2013.01); *H01M 2220/20* (2013.01)

(58) Field of Classification Search
CPC .............. H01M 50/249; H01M 50/271; B60K 2001/0438; B60K 2001/005
See application file for complete search history.

(56) References Cited

U.S. PATENT DOCUMENTS

| | | | | |
|---|---|---|---|---|
| 8,702,161 | B2 * | 4/2014 | Charbonneau | B62D 21/157 296/187.12 |
| 9,045,030 | B2 * | 6/2015 | Rawlinson | B60L 50/66 |
| 10,374,270 | B2 * | 8/2019 | Drabon | H01M 50/249 |
| 10,391,881 | B2 * | 8/2019 | Kim | H01M 10/613 |
| 10,933,726 | B2 * | 3/2021 | Handing | B60K 1/04 |
| 11,155,150 | B2 * | 10/2021 | Stephens | B60K 11/02 |
| 12,280,647 | B2 * | 4/2025 | Ota | H01M 10/6554 |
| 12,322,826 | B2 * | 6/2025 | Chi | H01M 50/249 |

(Continued)

FOREIGN PATENT DOCUMENTS

KR 19990039014 A 6/1999

*Primary Examiner* — Jeffrey J Restifo
(74) *Attorney, Agent, or Firm* — Lempia Summerfield Katz LLC

(57) ABSTRACT

A battery case includes a cooling block configured to constitute a lower portion of a battery case. The cooling block includes an upper portion on which a battery module is seated and is configured as an extruded component having therein a cooling channel formed in a transverse direction. The cooling block also includes a support flange formed at a front or rear end thereof and extending outward. The battery case further includes a side member configured to constitute a front or rear side of the battery case, configured as an extruded component extending in the transverse direction, and configured such that a surface of the side member and a surface of the cooling block, which face each other, are joined to each other in a state in which a lower surface of the side member is seated on an upper surface of the support flange of the cooling block.

16 Claims, 9 Drawing Sheets

(56) References Cited

U.S. PATENT DOCUMENTS

| | | | | |
|---|---|---|---|---|
| 12,330,515 | B2 * | 6/2025 | Bluemel | H01M 50/249 |
| 12,341,210 | B2 * | 6/2025 | Brenner | H01M 10/625 |
| 12,482,875 | B2 * | 11/2025 | Kellner | H01M 10/6556 |
| 12,519,154 | B2 * | 1/2026 | Hemetzberger | H01M 10/653 |
| 2023/0125261 | A1 * | 4/2023 | Gadamchetty | H01M 10/613<br>429/72 |
| 2023/0327257 | A1 * | 10/2023 | Ishitobi | B60L 50/66<br>429/120 |
| 2023/0387503 | A1 * | 11/2023 | Jeon | H01M 50/258 |
| 2024/0274955 | A1 * | 8/2024 | Okamoto | B60K 11/02 |
| 2024/0367498 | A1 * | 11/2024 | Harris | H01M 50/249 |
| 2024/0387905 | A1 * | 11/2024 | Shin | H01M 10/625 |
| 2024/0413432 | A1 * | 12/2024 | Ishizaki | H01M 10/6556 |
| 2024/0429518 | A1 * | 12/2024 | Dong | H01M 50/249 |
| 2025/0062440 | A1 * | 2/2025 | Shin | H01M 50/249 |
| 2025/0062470 | A1 * | 2/2025 | Shin | H01M 10/6556 |
| 2025/0125438 | A1 * | 4/2025 | Munt Ferrà | H01M 10/6556 |
| 2025/0135866 | A1 * | 5/2025 | Liu | B60L 50/64 |
| 2025/0183408 | A1 * | 6/2025 | Su | H01M 50/249 |
| 2025/0266547 | A1 * | 8/2025 | Park | H01M 50/249 |
| 2025/0276571 | A1 * | 9/2025 | Kim | B60K 1/04 |
| 2025/0279495 | A1 * | 9/2025 | Bilinski | H01M 10/625 |
| 2025/0286209 | A1 * | 9/2025 | Inoue | H01M 50/204 |
| 2025/0329855 | A1 * | 10/2025 | Rausch | H01M 10/625 |

* cited by examiner

→ : movement direction of impact when external impact is applied

BATTERY CASE

CROSS-REFERENCE TO RELATED APPLICATION

The present application claims priority to Korean Patent Application No. 10-2023-0106344, filed on Aug. 14, 2023, the entire contents of which are incorporated herein by reference.

BACKGROUND

Field

The present disclosure relates to a battery case, and more particularly, to a battery case capable of maintaining mechanical rigidity thereof while maximizing energy density of a battery.

Description of the Related Art

With global warming resulting in abnormal weather patterns around the world, the demand for fossil fuels is decreasing, and governments are implementing policies to suppress the use of fossil fuels.

As a representative example, internal combustion engines in automobiles, which mainly use gasoline and diesel fuel, are gradually being replaced with motors and batteries configured to operate the motors. Electric vehicles, which operate by using electrical energy, are environmentally friendly because the electric vehicles emit no exhaust gas.

Ongoing research is actively focused on increasing the energy density of batteries to improve the driving range (i.e., traveling distance) of electric vehicles, as higher driving distances per single charge are considered advantageous for electric vehicles.

As a representative method of increasing energy density, there is a method of manufacturing a battery by using a material having a larger discharge capacity than materials with the same weight or volume or a method of reducing a weight of a battery case in which a battery module is mounted.

The method of reducing the weight of the battery case has a problem in terms of safety because mechanical rigidity of the battery case may be reduced in comparison with the related art because of the exclusion of components of the battery case and a change in material. Accordingly, it can be said that it is important to manufacture a battery case light in weight while maintaining or increasing mechanical rigidity of the battery case.

The statements in this BACKGROUND section merely provide background information related to the present disclosure and may not constitute prior art.

SUMMARY

The present disclosure is proposed to solve these problems and aims to reduce the number of members, which have been provided as a plurality of members in a battery case. The present disclosure also reduces the number of through-pipes inserted into the members, thereby reducing a weight of the battery case. The present disclosure also aims to increase a cross-sectional moment of force of a cooling block provided on a lower surface of a battery case, thereby solving a problem of a decrease in mechanical rigidity that may be caused when a weight of the battery case is reduced.

Therefore, the number of battery cells mounted in the battery case is increased, the battery capacity is substantially increased, and the weight of the battery case is also reduced, such that the energy density of the battery can be increased.

In one embodiment of the present disclosure, a battery case includes: a cooling block configured to constitute a lower portion of a battery case, having an upper portion on which a battery module is seated, configured as an extruded component having therein a cooling channel formed in a transverse direction. The cooling block also includes a support flange formed at a front or rear end thereof and extending outward. The battery case further includes a side member configured to constitute a front or rear side of the battery case, configured as an extruded component extending in the transverse direction. In particular, a surface of the side member and a surface of the cooling block face each other and are joined to each other in a state in which a lower surface of the side member is seated on an upper surface of the support flange of the cooling block.

The support flange may be formed to extend downward from the front or rear end of the cooling block and then extend to the front or rear end.

A protruding projection may be provided at one end of the support flange and formed in a direction toward the cooling block, and the side member seated on the support flange may be supported by the protruding projection.

The support flange and the side member may be surface-welded.

A transverse member, which is provided in a transverse direction, and a longitudinal member, which is provided in a longitudinal direction, may be disposed inside the battery case so as to intersect each other and define a seating space in the battery case in which the battery module is seated, the transverse member may be provided as a single transverse member, and the longitudinal member may be provided as a single longitudinal member.

The battery case may further include: a through-pipe provided to penetrate the longitudinal member and the transverse member and provided at a point at which the transverse member and the longitudinal member intersect each other; and an upper cover configured to constitute an upper portion of the battery case and cover the battery module.

The upper cover may be coupled to at least one of the through-pipe, the longitudinal member, or the transverse member.

A mounting portion for fastening the longitudinal member and the battery module may be formed on one surface of the battery module so as to overlap a part of the longitudinal member, and a bushing may penetrate the mounting portion and the longitudinal member and fasten the battery module and the longitudinal member.

One end of the bushing may penetrate the mounting portion and the longitudinal member, the other end of the bushing may adjoin the upper cover, a hole may be formed at one point on the upper cover corresponding to the bushing, and a bolt may be inserted into the hole and the other end of the bushing such that the upper cover is coupled to the longitudinal member.

A gasket may be further provided at the other end of the bushing that adjoins the upper cover.

A contact bracket may be provided on an upper surface of the transverse member, one surface of the contact bracket may adjoin the upper cover, a hole may be formed at one point on the upper cover that adjoins the contact bracket, and a bolt may be inserted into the hole and the contact bracket such that the upper cover is coupled to the transverse member.

A gasket may be further provided on one surface of the contact bracket that adjoins the upper cover.

The battery case may further include: a front box configured to constitute a front end of the battery case and configured such that an electrical component electrically connected to a battery is seated in the front box; a longitudinal member configured to traverse an interior of the battery case in a longitudinal direction; and an extension member extending from the longitudinal member toward the front box and configured to traverse the front box in the longitudinal direction.

The cooling block, which is configured as an extruded component, may be provided on a lower portion of the front box and have the cooling channel formed in a longitudinal direction.

A pressing bracket for pressing the battery module may be further provided at a lateral side of the side member.

According to the battery case of the present disclosure, the mechanical rigidity of the battery case may be maintained by strengthening the structure of the cooling block even when the number of members in the battery case and the number of through-pipes, which penetrate the members, are reduced. Further, the weight of the battery case may be reduced, and a larger number of battery cells may be mounted to the extent of the space from which the members are excluded, such that the mechanical rigidity of the battery case may be maintained, and the energy density of the battery may be increased.

DETAILED DESCRIPTION

Figure 1:
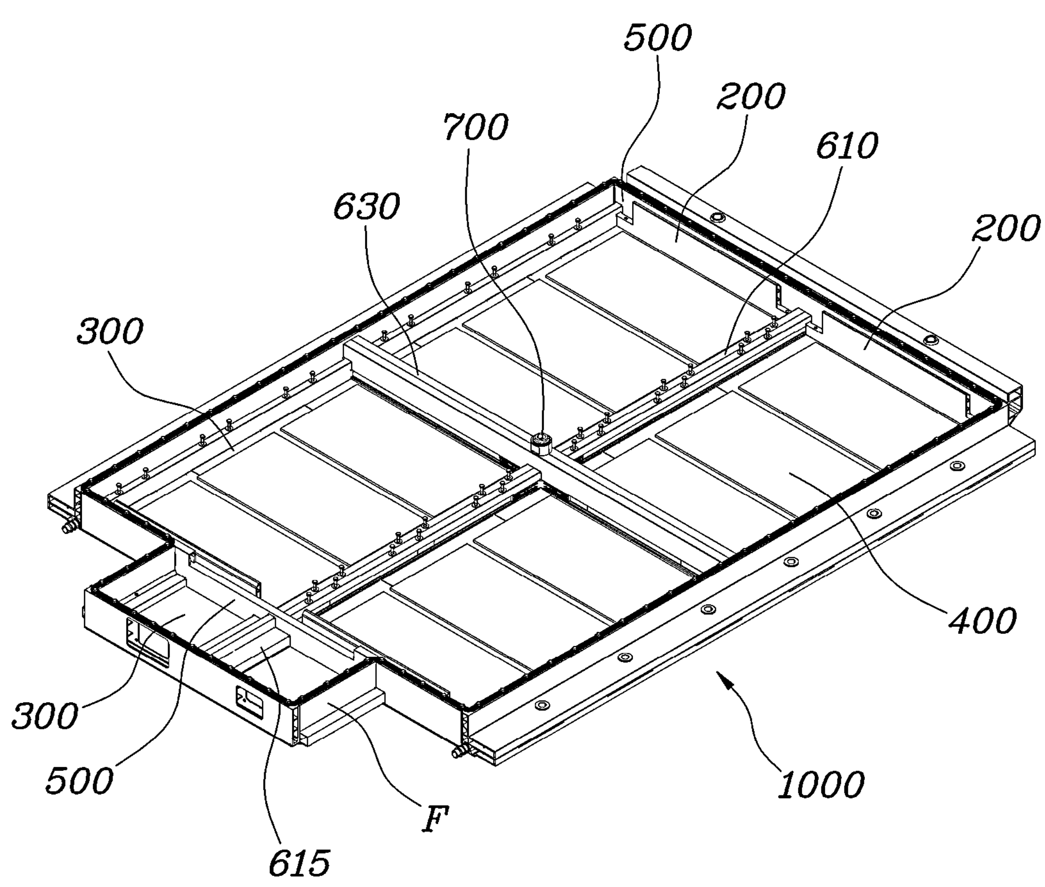
FIG. 1 is a view illustrating a battery case according to an embodiment of the present disclosure.

Hereinafter, embodiments disclosed in the present disclosure are described in detail with reference to the accompanying drawings. The same or similar constituent elements are assigned with the same reference numerals regardless of reference numerals, and the repetitive description thereof has been omitted.

In the description of the embodiments disclosed in the present disclosure, the specific descriptions of publicly known related technologies are omitted when it is determined that the specific descriptions may obscure the subject matter of the embodiments disclosed in the present disclosure. In addition, it should be interpreted that the accompanying drawings are provided only to allow those having ordinary skill in the art to easily understand the embodiments disclosed in the present disclosure, and the technical spirit disclosed in the present disclosure is not limited by the accompanying drawings, and includes all alterations, equivalents, and alternatives that are included in the spirit and the technical scope of the present disclosure.

The terms including ordinal numbers such as “first,” “second,” and the like may be used to describe various constituent elements, but the constituent elements are not limited by the terms. These terms are used only to distinguish one constituent element from another constituent element.

Singular expressions include plural expressions unless clearly described as different meanings in the context.

In the present disclosure, it should be understood the terms “comprises,” “comprising,” “includes,” “including,” “containing,” “has,” “having” or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

When one constituent element is described as being “coupled” or “connected” to another constituent element, it should be understood that one constituent element can be coupled or connected directly to another constituent element, and an intervening constituent element can also be present between the constituent elements. When one constituent element is described as being “coupled directly to” or “connected directly to” another constituent element, it should be understood that no intervening constituent element is present between the constituent elements.

When a component, device, element, or the like of the present disclosure is described as having a purpose or performing an operation, function, or the like, the component, device, or element should be considered herein as being “configured to” meet that purpose or to perform that operation or function.

FIG. 1 is a view illustrating a battery case according to an embodiment of the present disclosure.

According to an embodiment of the present disclosure, a battery case 1000 includes cooling blocks 300 configured to cool battery modules 100, and side members 500 that constitute front, rear, and lateral sides of the battery case 1000.

Specifically, the cooling blocks 300 constitute a lower portion of the battery case 1000, and the battery modules 100, which are cooling targets, are seated on upper portions of the cooling blocks 300. Gap fillers 400 for efficient heat exchange may be provided between the cooling blocks 300 and the battery module 100. A cooling channel 350 is formed in the cooling block 300, and a cooling medium, which exchanges heat with the battery module 100, flows through the cooling channel 350. The cooling channel 350 is disposed in a transverse direction to implement efficient heat exchange with the battery module 100. Therefore, a battery cell may also be disposed in the transverse direction in the battery module 100.

In the present disclosure, the term ‘transverse direction’ may mean a width direction of a vehicle, and the term ‘longitudinal direction’ may be understood as meaning a length direction of the vehicle.

Aluminum may be used as a material for manufacturing the cooling block 300. In addition, the cooling block 300 may be formed by melting aluminum and then performing extrusion. The cooling channel 350 may be designed and modified to be disposed so that the cooling channel 350 is positioned in the longitudinal direction.

Figure 2:
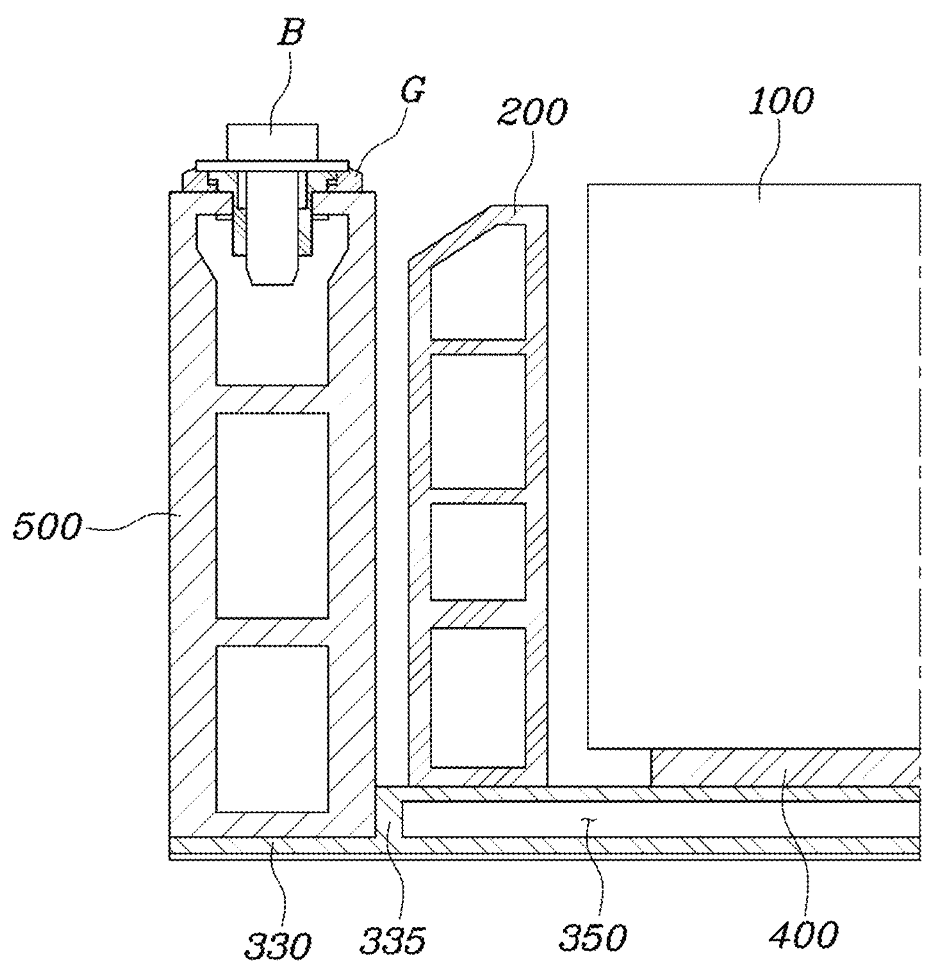
FIG. 2 is an enlarged view of a front end of a cooling block according to an embodiment of the present disclosure.

FIG. 2 is an enlarged view of a front end of the cooling block. With reference to FIG. 2, a support flange 330 is formed at a front or rear end of the cooling block 300 and extends outward. The side member 500, which constitutes the front side of the battery case 1000, is seated on the support flange 330, and a surface of the support flange 330 and a surface of the side member 500, which face each other, may be joined to each other.

The side member 500 may also be made of aluminum so as to be joined to the support flange 330 and manufactured by aluminum extrusion.

The rear side of the battery case 1000 may also be configured by the side member 500. Like the front end of the cooling block 300, the rear end of the cooling block 300 may also have the support flange 330, and the side member 500 may be joined to the support flange 330.

As described above, the junction and junction structure between the support flange 330 of the cooling block 300 and the side member 500 coupled to the support flange 330 may disperse routes of applied impact to the entire battery case 1000 including the cooling block 300 when external impact is applied to the vehicle. Therefore, overall deformation of the battery case 1000 may be induced.

Figure 3:
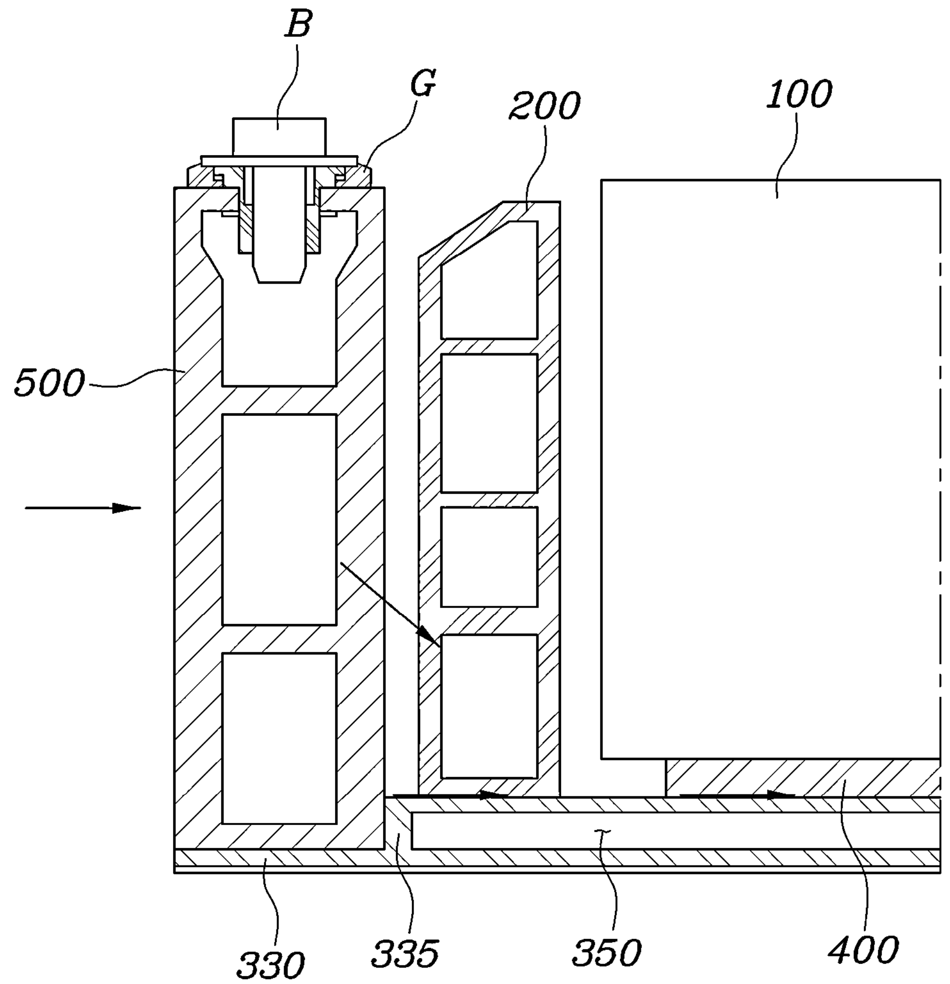
FIG. 3 is a view illustrating a movement direction of a load in the battery case when external impact is applied.

In other words, with reference to movement directions of impact illustrated in FIG. 3, a catching structure between the support flange 330 and the side member 500 prevents excessive impact from being transmitted to the battery case 1000 within a short time, such that the excessive impact is dispersed to the entire battery case 1000 over sufficient time, thereby inducing uniform deformation of the battery case 1000.

FIG. 3 is an enlarged view of a rear end of the cooling block. With reference to FIGS. 2 and 3, the support flange 330 formed at the front or rear end of the cooling block 300 extends downward from the front or rear end of the cooling block 300 and then extends to the front or rear end of the cooling block 300.

A protruding projection 335 is formed at one end of the support flange 330 formed, as described above, and the protruding projection 335 is formed in a direction toward the cooling block 300, more specifically, in a direction toward the battery module 100. The side member 500 seated on the support flange 330 is supported by the protruding projection 335.

The support flange 330 and the side member 500 may be joined by surface welding, i.e., by welding the surface of the support flange 330 and the surface of the side member 500 that face each other. For example, the side member 500 and the support flange 330 may be joined by friction stir welding (FSW).

The junction surfaces, which face each other, may be joined by repeating line welding multiple times instead of performing welding. However, the surface welding may reduce thermal deformation and welding time, thereby improving productivity. The surface welding may increase a welding area and maximize structure durability of the support flange 330 and the side member 500. Therefore, the surface welding is more preferred than the line welding.

Meanwhile, the junction structure between the support flanges 330 formed at the front and rear ends of the cooling block 300 and the side members 500 coupled to the support flanges 330 may disperse a load, which is generated by a forward or rearward collision of the vehicle, to the entire battery case 1000, which may induce the overall deformation of the battery case 1000.

In addition, the battery case 1000 may further include pressing brackets 200 each provided at a lateral side of the side member 500 and configured to press the battery module 100. The pressing bracket 200 is provided inside each of the side members 500 that constitute the front and rear sides of the battery case 1000. The pressing bracket 200 presses the battery module 100 so that the battery module 100 comes into close contact with a longitudinal member 610 or a transverse member 630. The pressing brackets 200 may minimize noise caused by vibration between the battery modules 100, between the battery module 100 and the longitudinal member 610 or the transverse member 630, or between the battery module 100 and the side member 500 and minimize unpleasantness to be felt by occupants while the vehicle travels.

The pressing brackets 200 may serve to improve mechanical rigidity of the battery case 1000 and disperse the routes, through which impact is transmitted when external impact is applied, to the entire battery case 1000.

Meanwhile, as described above, the coupling structure between the cooling block 300 and the side member 500 in the battery case 1000 may improve the mechanical rigidity of the battery case 1000, and some of the structures (e.g., the longitudinal member, the transverse member, or a through-pipe) for ensuring internal mechanical rigidity of the battery case 1000 may be excluded to the extent of the improved rigidity, such that a larger number of battery cells or battery modules may be seated in the battery case 1000.

In the related art, a plurality of longitudinal members and a plurality of transverse members are provided in a battery case 1000 to improve the mechanical rigidity of the battery case 1000. However, when the plurality of longitudinal members and the plurality of transverse members are provided, there is a problem in that a weight of the battery case is increased, and a space in the battery case in which the battery module is seated is narrowed.

In the present disclosure, in order to maximize the number of battery modules seated in the battery case 1000, some of the longitudinal or transverse members, which have been provided as the plurality of members in the related art, are excluded, and a single longitudinal member and a single transverse member are provided in the battery case 1000, such that the space in which the battery modules are seated is maximized, which reduces a weight of the battery case 1000. Further, the battery capacity is increased, which maximizes energy density.

In other words, according to the embodiment of the present disclosure, the transverse member 630 is provided in a transverse direction, and the longitudinal member 610 is provided in a longitudinal direction. The transverse member 630 and the longitudinal member 610 are disposed inside the battery case 1000 while intersecting each other, thereby defining seating spaces in the battery case 1000 in which the battery modules 100 are seated. The single transverse member 630 and the single longitudinal member 610 may be provided.

In addition, the battery case 1000 may further include a through-pipe 700 provided to penetrate the longitudinal member 610 and the transverse member 630 and disposed at a point at which the transverse member 630 and the longitudinal member 610 intersect each other. The battery case 1000 may further include an upper cover 900 configured to constitute an upper portion of the battery case 1000 and cover the battery module 100.

Figure 4:
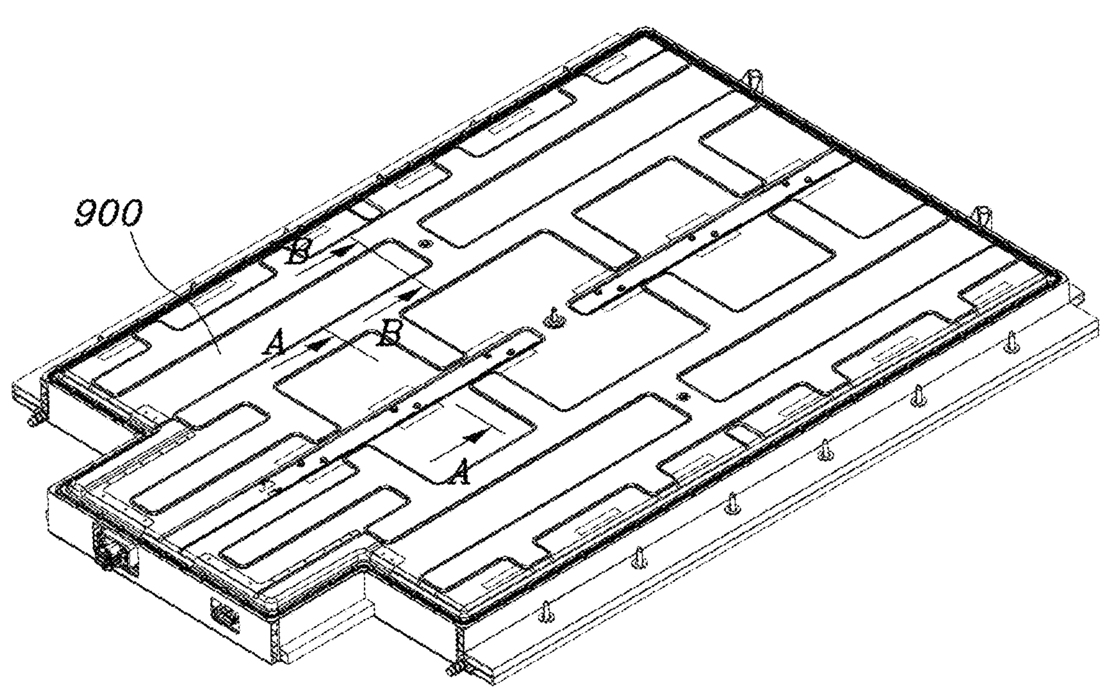
FIG. 4 is a view illustrating the battery case including an upper cover according to an embodiment of the present disclosure.

FIG. 4 is a view illustrating the battery case including the upper cover according to the embodiment of the present disclosure. Hereinafter, a fastening relationship between the upper cover 900 and the remaining battery case 1000 is described.

The upper cover 900 may be coupled to any one or more of the through-pipe 700, the longitudinal member 610, and the transverse member 630. First, a fastening relationship between the upper cover 900 and the longitudinal member 610 is described below.

Figure 5:
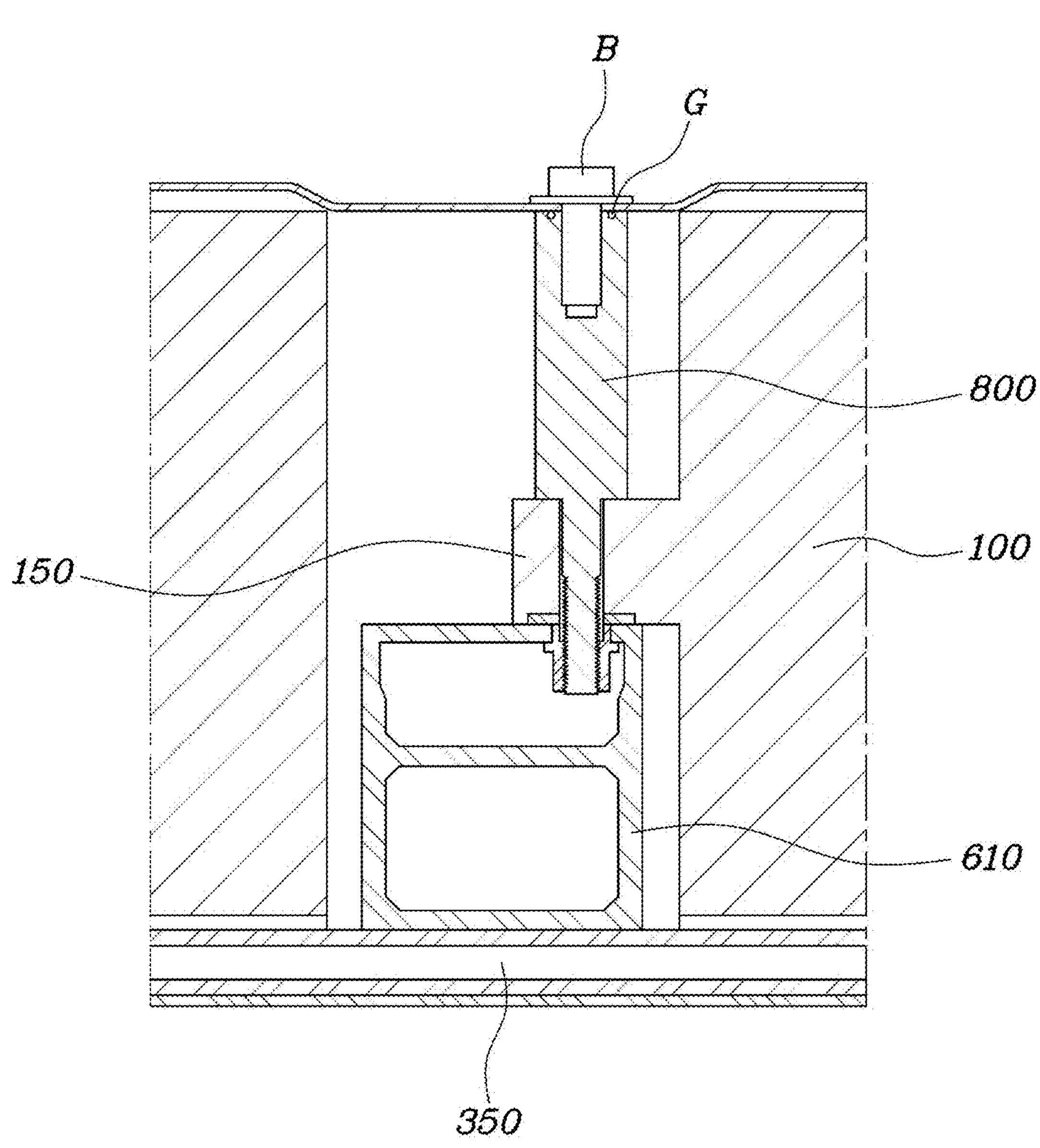
FIG. 5 is a view illustrating a cross-section taken along line A-A' in FIG. 4.
Figure 6:
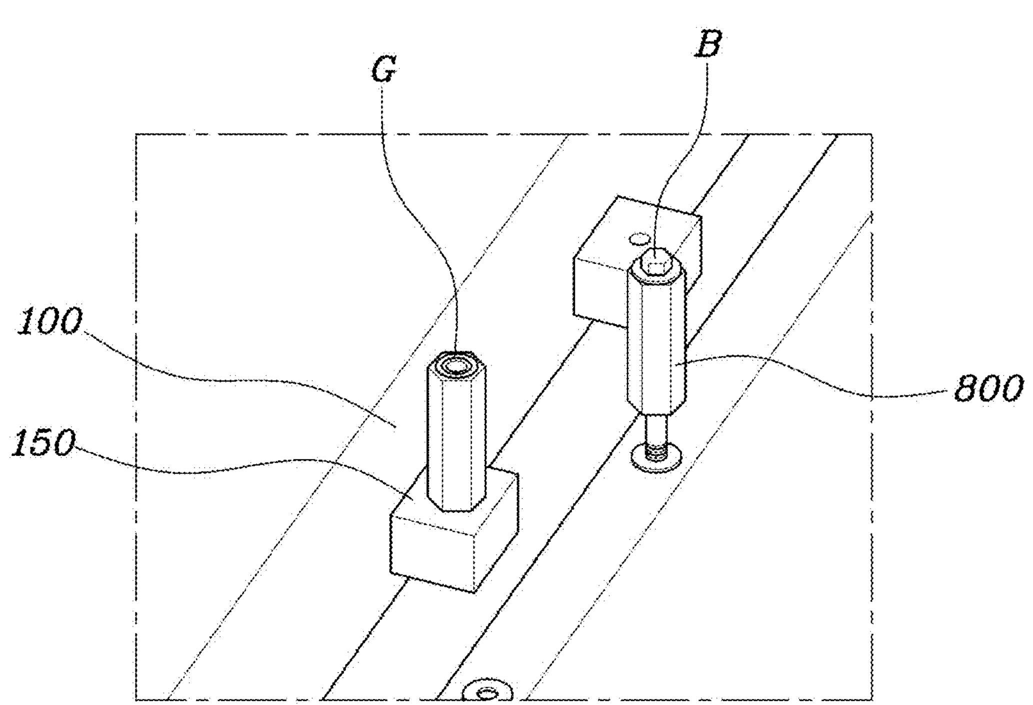
FIG. 6 is a view illustrating a state in which a longitudinal member and a battery module are fastened according to an embodiment of the present disclosure.

FIG. 5 is a view illustrating a cross-section taken along line A-A' in FIG. 4, and FIG. 6 is a view illustrating a state in which the longitudinal member and the battery module are fastened. With reference to FIGS. 5 and 6, a mounting portion 150 is formed on one surface of the battery module 100 and used to fasten the battery module 100 and the longitudinal member 610 in a direction toward the longitudinal member 610. The mounting portion 150 is formed on the battery module 100 and disposed at a position higher than a height of the longitudinal member 610 so as to overlap a part of the longitudinal member 610. More specifically, an endplate, which presses the stacked battery cells, may be provided at an outermost periphery of the battery module, and the mounting portion 150 may be formed on one surface of the endplate.

A bushing 800 is separately provided at a position at which the mounting portion 150 and the longitudinal member 610 overlap each other. The bushing 800 may penetrate the mounting portion 150 and the longitudinal member 610 and primarily fasten the battery module 100 and the longitudinal member 610.

Meanwhile, one end of the bushing 800 may penetrate the mounting portion 150 and the longitudinal member 610, and the other end of the bushing 800 adjoins the upper cover 900. A hole may be formed at one point on the upper cover 900 corresponding to the bushing 800, and a bolt B may be inserted into the hole and the other end of the bushing 800, thereby coupling the upper cover 900 to the battery module 100 and the longitudinal member 610.

In addition, in order to maximally prevent foreign substances, outside air, and the like from being introduced into the battery case 1000, a gasket G may be further provided at the other end of the bushing 800 that adjoins the upper cover 900, thereby maintaining watertightness and sealability in the battery case 1000.

Next, a fastening relationship between the upper cover 900 and the transverse member 630 is described below.

Figure 7:
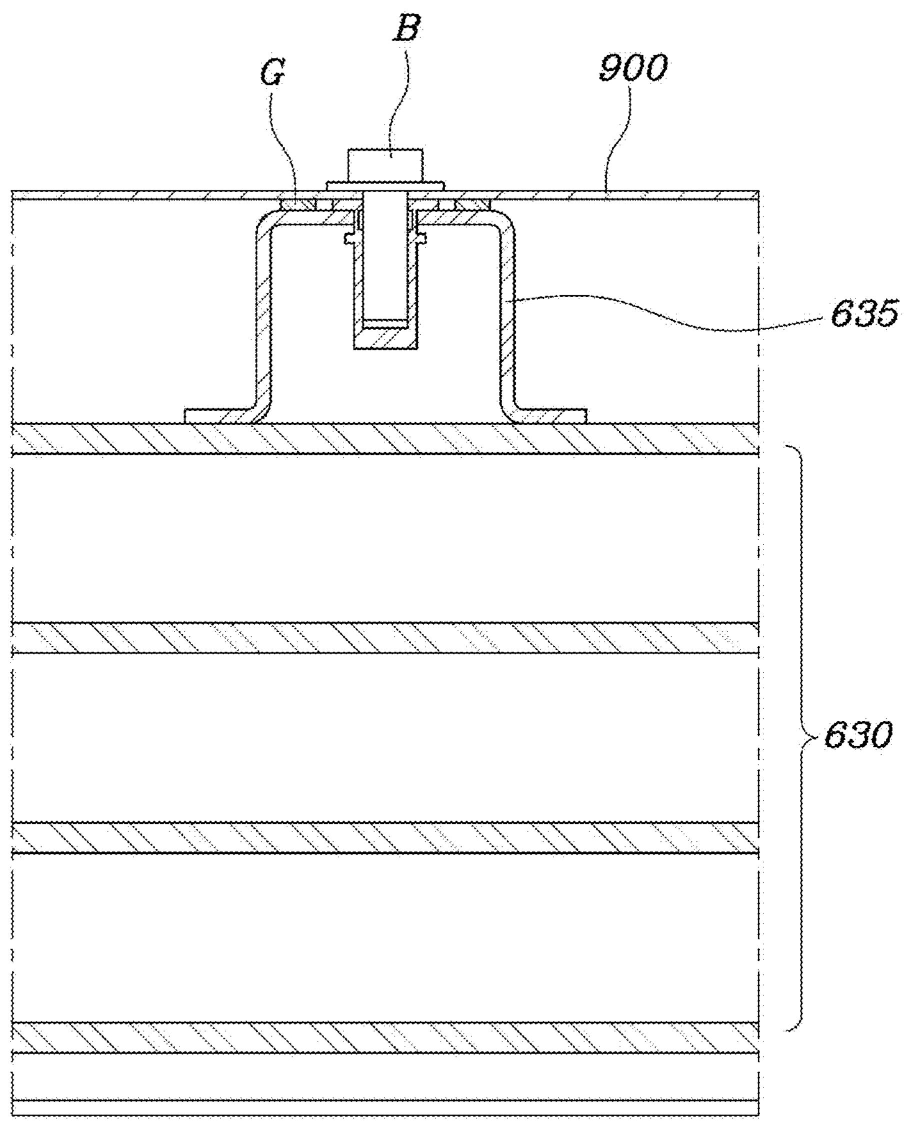
FIG. 7 is a view illustrating a cross-section taken along line B-B' in FIG. 4.

FIG. 7 is a view illustrating a cross-section taken along line B-B' in FIG. 4. With reference to FIG. 7, a contact bracket 635 is provided on an upper surface of the transverse member 630. The contact bracket 635 is an intermediate component for fastening the upper cover 900 and the transverse member 630. The contact bracket 635 may be welded to the upper surface of the transverse member 630, and one surface of the welded contact bracket 635 may adjoin the upper cover 900. A hole may be formed at one point on the upper cover 900 that adjoins the contact bracket 635, and the bolt B may be inserted into the hole and the contact bracket 635, such that the upper cover 900 may be coupled to the transverse member 630.

Meanwhile, the gasket G may be further provided on one surface of the contact bracket 635 that adjoins the upper cover 900, thereby maximally preventing foreign substances, outside air, and the like from being introduced into the battery case 1000.

Meanwhile, the through-pipe 700 is provided to penetrate the longitudinal member 610 and the transverse member 630 and disposed at the point at which the longitudinal member 610 and the transverse member 630 intersect each other. A long bolt may be inserted into the through-pipe 700 to fasten the battery case 1000 to a vehicle body. The long bolt penetrates the upper cover 900 before penetrating the vehicle body.

The above-mentioned structure may connect the upper cover 900 and the longitudinal member 610 or the transverse member 630. The connection relationships between the upper cover, the battery module mounting portion, the longitudinal member, and the cooling block are configured to achieve the structural rigidity of the battery case 1000, such that the mechanical rigidity of the battery case 1000 may be maintained even when the number of transverse members 630, the number of longitudinal members 610, and the number of through-pipes 700 are decreased in the battery case 1000.

Figure 8:
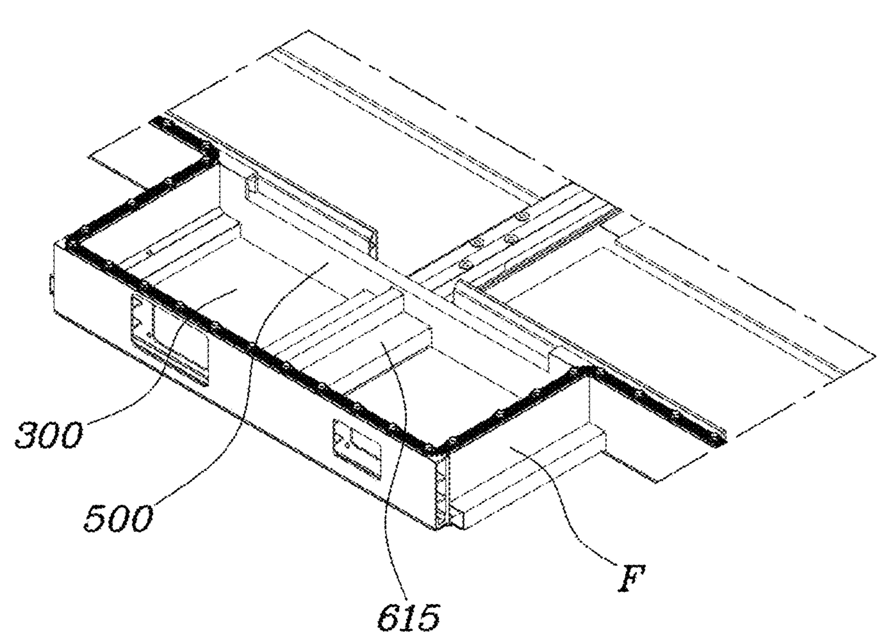
FIG. 8 is a view illustrating a front box of the battery case according to an embodiment of the present disclosure.

Meanwhile, the battery case 1000 may further include a front box F that defines the front end of the battery case 1000, and electrical components electrically connected to the battery may be seated in the front box F. FIG. 8 is a view illustrating the front box of the battery case 1000 according to the embodiment of the present disclosure. With reference to FIG. 8, electrical components, such as a power relay assembly (PRA), a fuse, a high-voltage connector, and a low-voltage connector, may be seated in the front box F.

An extension member 615 may be further provided in the front box F. The extension member 615 extend from the longitudinal member 610 toward the front box, and traverse the front box F in the longitudinal direction, and the extension member 615 may be connected to the longitudinal member 610. Therefore, when external impact is applied from the front side, the external impact may be transmitted to the longitudinal member 610 and the cooling block 300 through the extension member 615.

Figure 9:
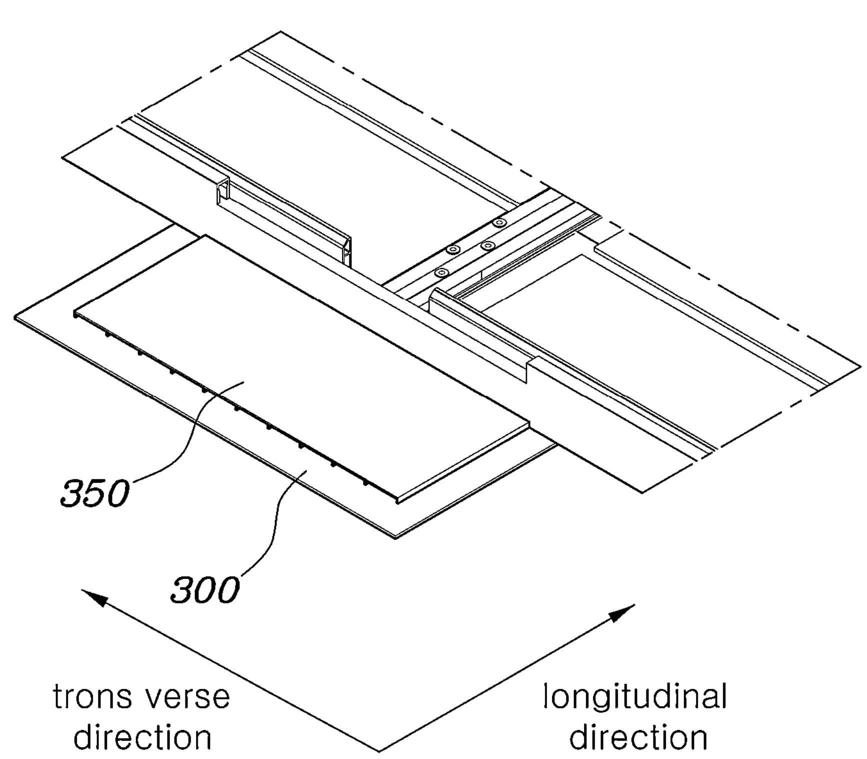
FIG. 9 is a view illustrating a state in which a cooling channel of the cooling block, which is formed on a lower portion of the front box, is disposed.

In addition, the cooling block 300, which is configured as an extruded component, may be provided on a lower portion of the front box F and have the cooling channel 350 formed in the longitudinal direction. FIG. 9 is a view illustrating a state in which the cooling channel of the cooling block, which is formed on the lower portion of the front box, is disposed. With reference to FIG. 9, the cooling channel 350 of the cooling block 300 for cooling the battery module 100 may be disposed in the transverse direction, and the cooling channel 350 of the cooling block 300 for cooling the electrical component seated in the front box F is disposed in the longitudinal direction, thereby preparing for all a forward collision, a rearward collision, and a side collision.

In other words, the cooling channel 350 provided in the rear portion of the battery case 1000 may be configured in the transverse direction in consideration of a side collision, and the cooling channel 350 in the front portion of the battery case 1000 may be configured in the longitudinal direction in consideration of a forward collision and a rearward collision, or vice versa.

The above-mentioned components and the connection relationships between the components may maintain the mechanical rigidity even when some of the components in the battery case 1000 are excluded. Further, the battery cells or the battery modules may be disposed in the space that has been occupied by the excluded components, such that the battery capacity may be increased, thereby providing the battery case 1000 capable of increasing overall energy density.

While the specific embodiments of the present disclosure have been illustrated and described, it should be obvious to those of having ordinary skill in the art that the present disclosure may be variously modified and changed without departing from the technical spirit of the present disclosure defined in the appended claims.

| DESCRIPTION OF REFERENCE NUMERALS | |
|---|---|
| 100: Battery module | 200: Pressing bracket |
| 300: Cooling block | 400: Gap filler |
| 500: Side member | 610: Longitudinal member |
| 630: Transverse member | 700: Through-pipe |
| 800: Bushing | 900: Upper cover |

What is claimed is:

1. A battery case comprising:

a cooling block configured to form a lower portion of the battery case and configured as an extruded component formed with a cooling channel in a transverse direction, wherein the cooling block includes an upper portion on which a battery module is seated, and a support flange formed at a front or rear end thereof and extending outward; and a side member configured to form a front or rear side of the battery case and configured as an extruded component extending in the transverse direction, wherein a surface of the side member and a surface of the cooling block face each other and are joined to each other in a state in which a lower surface of the side member is seated on an upper surface of the support flange of the cooling block, wherein a protruding projection is provided at one end of the support flange and formed in a direction toward the cooling block, and the side member seated on the support flange is supported by the protruding projection.

2. The battery case of claim 1, wherein the support flange is formed to extend downward from the front or rear end of the cooling block and then extend to the front or rear end.

3. The battery case of claim 1, wherein the support flange and the side member are surface-welded.

4. The battery case of claim 1, further comprising a pressing bracket configured to press the battery module and provided at a lateral side of the side member.

5. A battery case comprising:

a cooling block configured to form a lower portion of the battery case and configured as an extruded component formed with a cooling channel in a transverse direction, wherein the cooling block includes an upper portion on which a battery module is seated;

a support flange formed at a front or rear end thereof and extending outward; and a side member configured to form a front or rear side of the battery case and configured as an extruded component extending in the transverse direction, wherein a surface of the side member and a surface of the cooling block face each other and are joined to each other in a state in which a lower surface of the side member is seated on an upper surface of the support flange of the cooling block;

a transverse member provided in the transverse direction; and a longitudinal member provided in a longitudinal direction, wherein the transverse member and the longitudinal member are disposed inside the battery case so as to intersect each other and configured to define a seating space in the battery case in which the battery module is seated, and wherein the transverse member is provided as a single transverse member, and the longitudinal member is provided as a single longitudinal member.

6. The battery case of claim 5, further comprising:

a through-pipe provided to penetrate the longitudinal member and the transverse member, wherein the through-pipe is disposed at a point at which the transverse member and the longitudinal member intersect each other; and an upper cover configured to form an upper portion of the battery case and cover the battery module.

7. The battery case of claim 6, wherein the upper cover is coupled to at least one of the through-pipe, the longitudinal member, or the transverse member.

8. The battery case of claim 6, further comprising:

a mounting portion configured to fasten the longitudinal member and the battery module and formed on one surface of the battery module so as to overlap a part of the longitudinal member; and a bushing configured to penetrate the mounting portion and the longitudinal member and fasten the battery module and the longitudinal member.

9. The battery case of claim 8, wherein a first end of the bushing is configured to penetrate the mounting portion and the longitudinal member, a second end of the bushing is configured to adjoin the upper cover, a hole is formed at one point on the upper cover corresponding to the bushing, and a bolt is inserted into the hole and the second end of the bushing such that the upper cover is coupled to the longitudinal member.

10. The battery case of claim 9, further comprising a gasket provided at the second end of the bushing that adjoins the upper cover.

11. The battery case of claim 6, further comprising: a contact bracket provided on an upper surface of the transverse member, wherein one surface of the contact bracket adjoins the upper cover, a hole is formed at one point on the upper cover that adjoins the contact bracket, and a bolt is inserted into the hole and the contact bracket such that the upper cover is coupled to the transverse member.

12. The battery case of claim 11, further comprising a gasket provided on one surface of the contact bracket that adjoins the upper cover.

13. The battery case of claim 5, further comprising a pressing bracket configured to press the battery module and provided at a lateral side of the side member.

14. A battery case comprising:

a cooling block configured to form a lower portion of the battery case and configured as an extruded component formed with a cooling channel in a transverse direction, wherein the cooling block includes an upper portion on which a battery module is seated;

a support flange formed at a front or rear end thereof and extending outward; and a side member configured to form a front or rear side of the battery case and configured as an extruded component extending in the transverse direction, wherein a surface of the side member and a surface of the cooling block face each other and are joined to each other in a state in which a lower surface of the side member is seated on an upper surface of the support flange of the cooling block;

a front box configured to constitute a front end of the battery case and configured such that an electrical component electrically connected to a battery is seated in the front box;

a longitudinal member configured to traverse an interior of the battery case in a longitudinal direction; and an extension member extending from the longitudinal member toward the front box and configured to traverse the front box in the longitudinal direction.

15. The battery case of claim 14, wherein the cooling block, which is configured as an extruded component, is provided on a lower portion of the front box and has the cooling channel formed in the longitudinal direction.

16. The battery case of claim 14, further comprising a pressing bracket configured to press the battery module and provided at a lateral side of the side member.

* * * * *